H. P. HALL.
CORN-PLANTER.

No. 184,710.
Patented Nov. 28, 1876.

WITNESSES
Henry N. Miller
F. L. Durand

INVENTOR
Henry P. Hall
By Vandee Hason
Attorneys

UNITED STATES PATENT OFFICE.

HENRY P. HALL, OF BLOOMINGTON, ILLINOIS.

IMPROVEMENT IN CORN-PLANTERS.

Specification forming part of Letters Patent No. 184,710, dated November 28, 1876; application filed April 15, 1876.

*To all whom it may concern:*

Be it known that I, HENRY P. HALL, of Bloomington, in the county of McLean, and in the State of Illinois, have invented certain new and useful Improvements in Droppers and Markers to be attached to Corn-Planters; and do hereby declare that the following is a full, clear, and exact description thereof, reference being had to the accompanying drawing, and to the letters of reference marked thereon, making a part of this specification.

The nature of my invention consists in the construction and arrangement of a marking and dropping attachment for corn-planters, as will be hereinafter more fully set forth.

In order to enable others skilled in the art to which my invention appertains to make and use the same, I will now proceed to describe its construction and operation, referring to the annexed drawing, in which—

Figure 1:
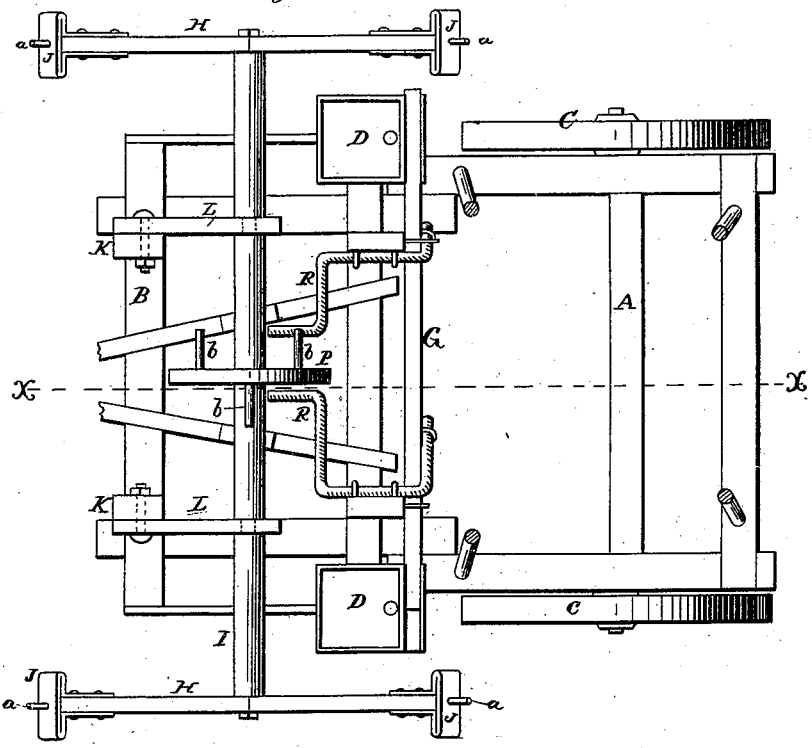
Figure 2:
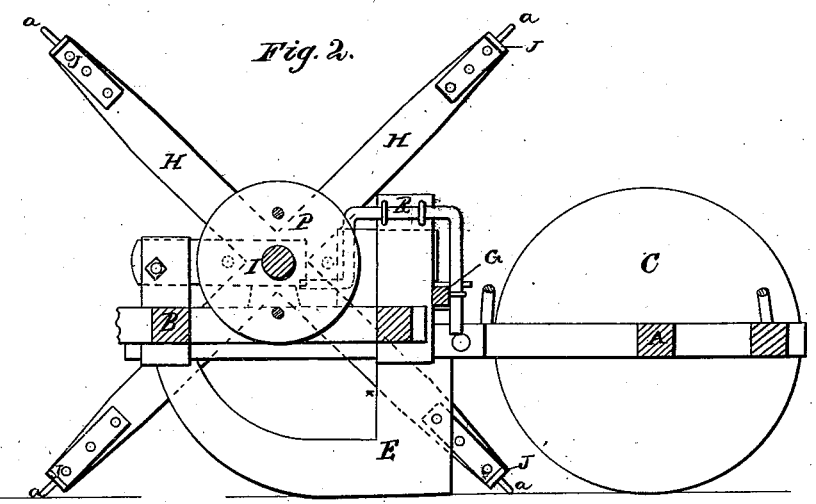

Figure 1 is a plan view of a corn-planter embodying my invention. Fig. 2 is a vertical section of the same on the line $x\ x$, Fig. 1.

A and B represent the ordinary corn-planter frames, the former being mounted upon wheels C C, and the latter provided with the runners E E, corn-boxes D D, and dropping-slide G, all constructed substantially in any of the known and usual ways.

On each side of the planter is placed a marker made of two pieces of timber, H H, crossing each other at right angles, and securely fastened to the end of a shaft, I, which crosses the planter at right angles to the line of draft, and is long enough to cross two rows of corn and reach to about the middle of the next rows. The feet J of these markers must always be in the same plane. The line which subtends the right angle made by the crossing of the timbers H H must be just as long as the distance the hills are to be from each other, so that the length of the arms of the right angles must depend on the desired distance of the hills from each other. On the end of each arm of the right angle is attached a metal foot, J, which is wide enough and long enough to prevent the arms from sinking too deeply into the ground, each foot having a metal pin, $a$, projecting from the middle, and the feet made of suitable size to make marks sufficiently large to drive by on the next turn. These feet J are made each of a single piece of metal, bent in the form of the letter T, so as to not only protect the ends but also the sides of the arms H, when secured thereto, and are usually made about twelve inches long, and the shaft I, to which said markers are attached, so long that on the return drive the outer ends of the feet will just meet the marks left by the outer ends of the feet on the last drive.

The corn is dropped exactly in line with the marks left by the markers, so that the field is check-rowed, and the driver thereby knows exactly where to begin if interrupted in the field.

The shaft I passes through the ends of two arms, L L, in which it works freely, the shaft having shoulders or flanges on both sides of the arms to prevent any lateral motion. These arms work freely on pivots, by which they are connected to uprights K K, fastened to the front cross-bar of the frame B.

In the center of the shaft I is securely fastened a wheel, P, on each side of which, and in line with the axis of the shaft, are two projecting pins, $b\ b$, so arranged that a line drawn between the pins and through the center of the shaft on one side will be at right angles with a line drawn in like manner between the pins on the opposite side of the wheel. These pins strike alternately against the bent ends of two levers, R R, which operate the dropping slide-bar G.

Instead of the pins $b$ and the sides of the wheel P, cams may be used for the same purpose.

Having thus fully described my invention, what I claim as new, and desire to secure by Letters Patent, is—

1. The feet J, made of a single piece of metal bent in T shape, provided with projecting pins $a$, and secured to the arms H, substantially as and for the purposes herein set forth.

2. The combination of the markers H, with feet J and pins *a*, the shaft I, pivoted arms L, and uprights K, substantially as and for the purposes herein set forth.

3. The combination of the markers H, with feet J and pins *a*, the shaft I, with wheel P, having pins *b b*, and supported in the arms L, pivoted to the uprights K, the levers R, and slide G, all substantially as and for the purposes herein set forth.

In testimony that I claim the foregoing I have hereunto set my hand this 18th day of February, 1876.

HENRY P. HALL.

Witnesses:
W. M. HATCH,
M. A. LANGE.